Patented Nov. 15, 1938

2,137,095

UNITED STATES PATENT OFFICE 2,137,095

PURIFICATION OF HYDROGEN HALIDES

Edward B. Peck, Elizabeth, N. J., assignor to Standard Oil Development Company, a corporation of Delaware No Drawing. Application December 24, 1936, Serial No. 117,538

4 Claims. (Cl. 23—152)

This invention relates to the purification of hydrogen halides. More specifically, it concerns the purification of hydrogen halides which contain free halogen impurities.

Hydrogen halides such as hydrogen chloride (HCL) have for some time been considered as commercial waste products and very little effort was spent toward their purification. Within recent years, however, a number of chemical processes have been developed wherein pure hydrogen chloride may be employed as a raw material for further syntheses. For example, olefines such as ethylene may be combined with hydrogen chloride in presence of catalysts to give high yields of alkyl halides.

Unfortunately, much of the commercially available by-product hydrogen chloride is contaminated with free halogen such as chlorine, which interferes with the reaction of the halide and likewise has a tendency to destroy the catalyst.

It is an object of this invention to effectively remove such halogens, regardless of whether they are present in low concentrations, say 0.1% or 1% or in high concentrations in the neighborhood of 10 or 20% or more. By such a step it is possible to prepare a substantially pure hydrogen chloride-containing gas suitable for the preparation of alkyl chlorides, etc.

This object is attained by scrubbing the hydrogen chloride-containing gas with a liquid hydrocarbon material having a low volatility and a substantially high flash point. The treatment especially suited for this purpose comprises countercurrent contacting of the impure hydrogen chloride-containing gas with a closely fractionated petroleum oil having a viscosity of less than 45 seconds Saybolt at 210° F. This may be done at room temperatures or at temperatures in the range of 0–200° F. It is also preferable to employ an oil having a flash point about 300° F. Of the types of oils which may be employed, the highly cracked products such as cycle gas oil, cracking coil tar fractions, etc., are preferred, although highly aromatic fractions such as $SO_2$, phenol, or other solvent petroleum extracts, diphenyl, diphenyl oxide, and similar aromatic hydrocarbons may be used.

The treatment consists generally in passing the chlorine-containing hydrogen chloride through a tower filled with ceramic contact material over which is trickled the oil described above. A reaction takes place and in many instances cooling must be resorted to. The gas may be dried prior to or after this treatment. The contacting may also be carried out in a bubble plate tower or mixer such as a turbo-mixer, of suitable corrosion resistant material. The time of contact employed varies with the type of oil employed, and is generally in the neighborhood of 0.2 to 5 seconds.

This invention is not limited by the specific illustrations nor by any mechanism of operation, but only by the following claims in which the intention is to cover the invention as broadly as the prior art permits.

I claim:

1. The method of removing free halogen impurity from hydrogen halides containing not substantially more than 20% of free halogen which comprises contacting the mixture in gaseous form with a liquid cracked petroleum oil having a high flash point and containing substantial quantities of unsaturated hydrocarbons, at a temperature substantially below the flash point of the oil.

2. The method of removing free halogen impurity from hydrogen halides containing not substantially more than 20% of free halogen which comprises contacting the mixture in gaseous form with a liquid cracked petroleum oil having a flash point above 300° F. and containing substantial quantities of unsaturated hydrocarbons, at a temperature not substantially above 200° F.

3. The method of removing free chlorine impurity from hydrogen chloride containing not substantially more than 20% of free chlorine which comprises contacting the mixture in gaseous form with a liquid cracked petroleum oil having a flash point above 300° F. and containing substantial quantities of unsaturated hydrocarbons, at a temperature not substantially above 200° F.

4. The method of removing free chlorine impurity from hydrogen chloride containing not substantially more than 20% of free chlorine which comprises contacting the mixture in gaseous form with a liquid cracked petroleum oil having a flash point above 300° F. and a viscosity of less than 45 seconds Saybolt Universal at 210° F. and containing substantial quantities of unsaturated hydrocarbons, at a temperature of 0 to 200° F.

EDWARD B. PECK.